UNITED STATES PATENT OFFICE.

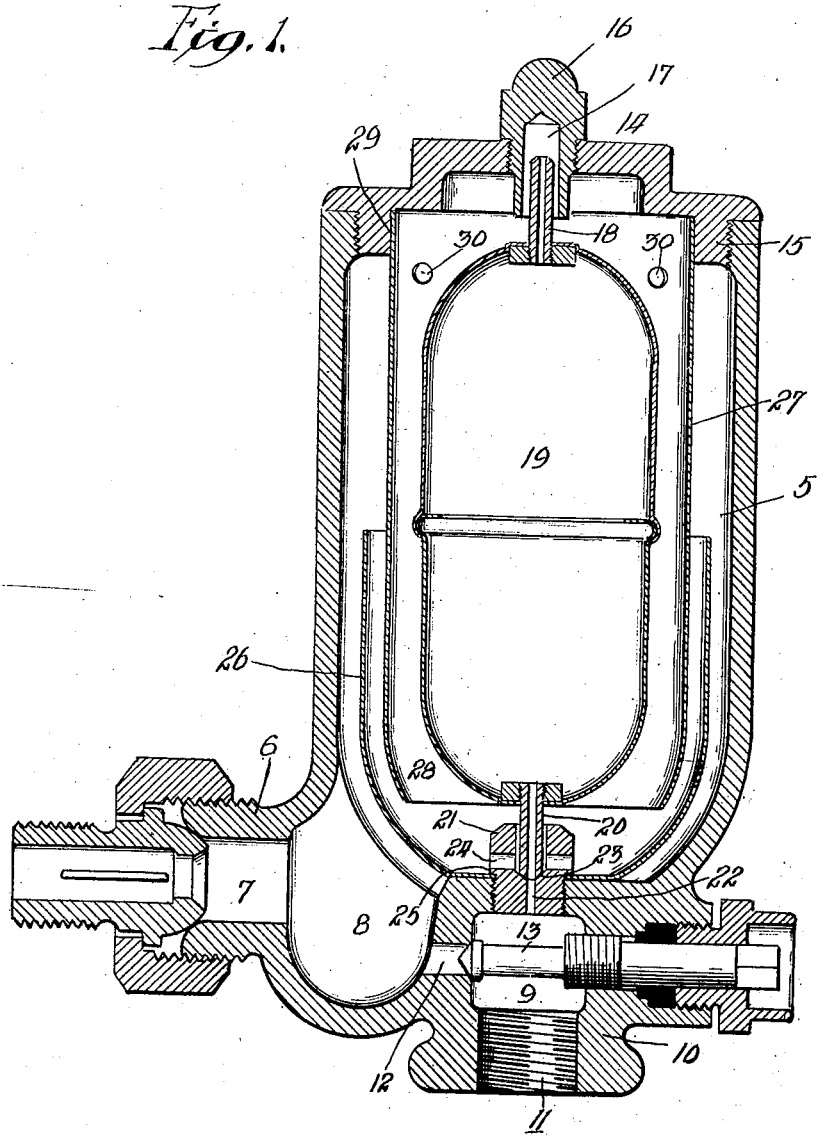

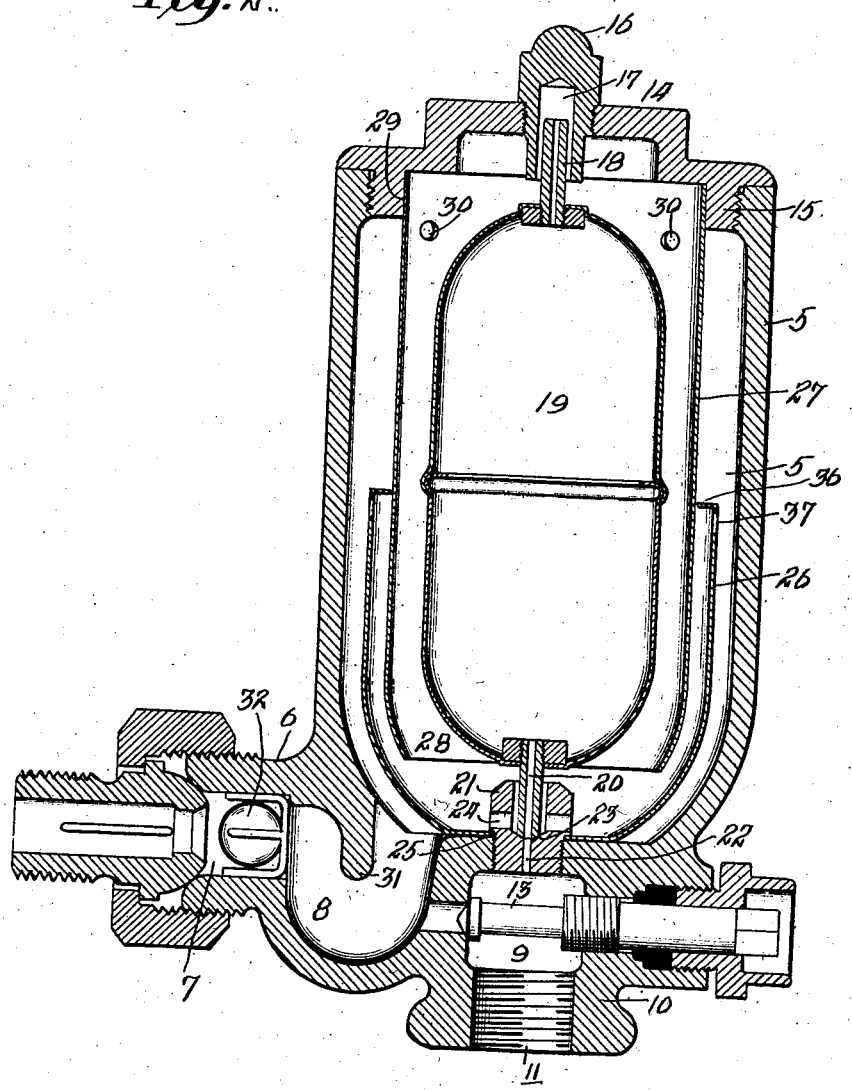

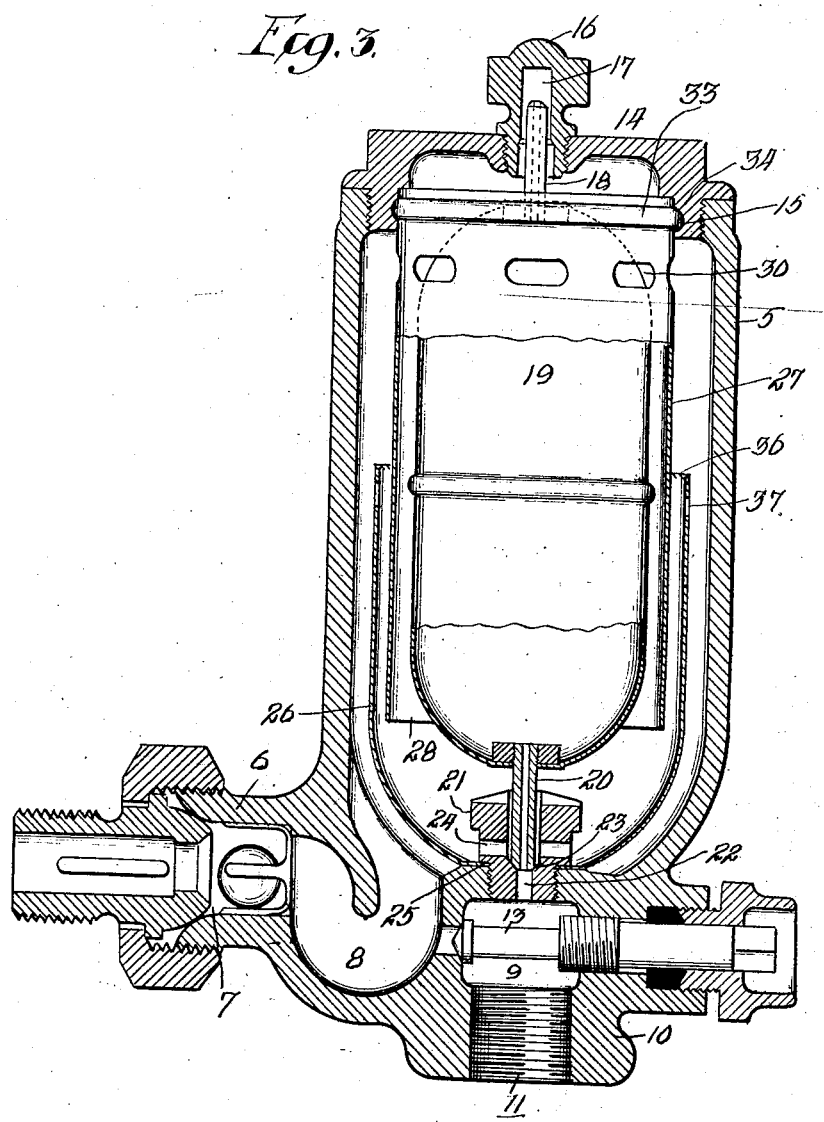

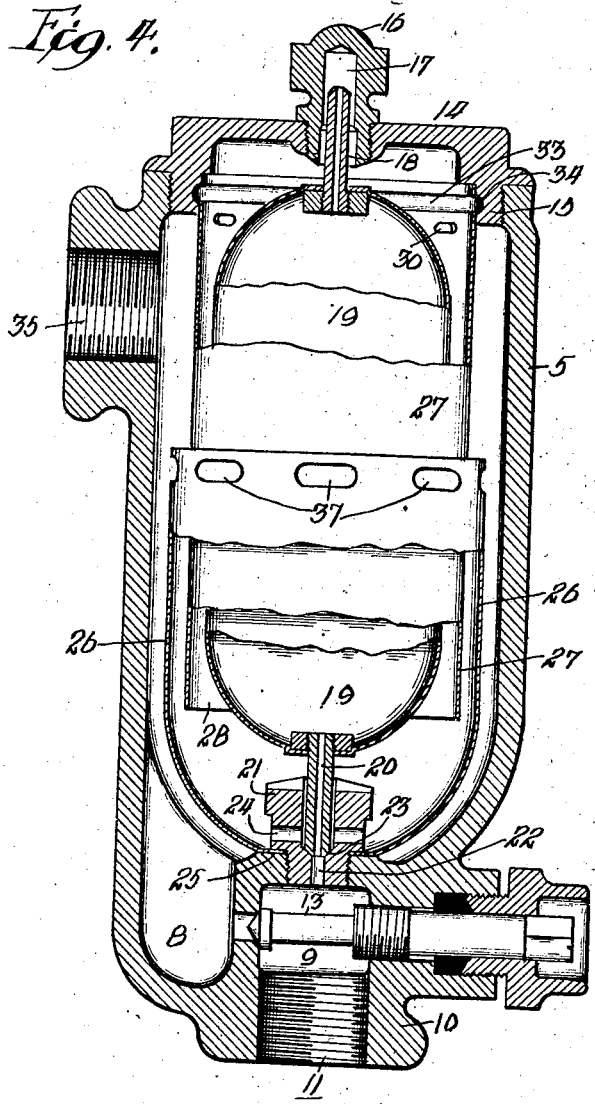

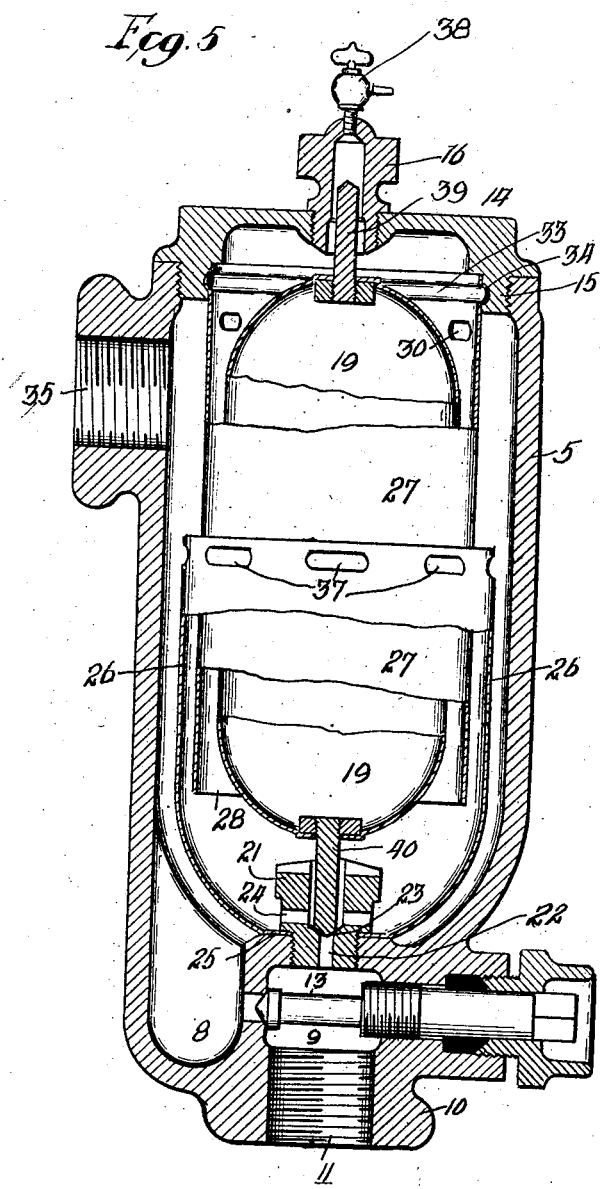

FRED W. LEUTHESSER, OF CHICAGO, ILLINOIS

AIR AND WATER DISCHARGE VALVE FOR RADIATORS.

954,815.  Specification of Letters Patent.  Patented Apr. 12, 1910.

Application filed December 27, 1909. Serial No. 535,183.

To all whom it may concern:

Be it known that I, FRED W. LEUTHESSER, a citizen of the United States, residing at Chicago, in the county of Cook and State of Illinois, have invented certain new and useful Improvements in Air and Water Discharge Valves for Radiators, of which the following is a specification.

The valve of the present invention is intended to be attached to the return end of a steam radiator for the purpose of discharging air and water of condensation from the radiator without permitting the escape of a material volume of steam.

The present valve is of the type which employs a float for the purpose of regulating the discharge of the water of condensation; and the principal object of the invention is to protect the float from agitation due to the in-rush of water, by locating the float in a substantially quiet body of water, which will be outside of the current or flow of water from the inlet to the point of discharge into the return pipe. By arranging the float in the manner stated, it will act entirely by flotation and will not be subjected to the impact of the water entering the valve casing, with the result that the operation of the float will be practically noiseless, which is of great importance in the operation of valves applied to radiators in hospitals, lecture halls, schoolrooms, or other places where quiet is desired.

A further object of the invention is to so arrange the inner mechanism of the valve that the same can be readily removed and cleaned when necessary, without removing the body of the valve casing from the pipe connections, and without disturbing the main portion of the valve as a whole.

Another object of the invention is to so arrange the discharge outlet that grease, dirt, or floatage, will not come in contact with the float and coat the same to an extent which would interfere with the proper action of the float or the valve controlled thereby.

Further objects of the invention will appear from a detailed description of the invention, which consists in the features of construction and combination of parts hereinafter described and claimed.

In the drawings, Figure 1 is a sectional elevation of the preferred form of valve; Fig. 2 a similar view of a similar valve, having a baffle plate and ball check valve added thereto; Fig. 3 a sectional elevation of a similar valve showing a slightly different method of securing the inner shell to the cap or cover; Fig. 4 a sectional elevation of the valve, similar in general arrangement to the valve of Fig. 3 and having the inlet at the top; and Fig. 5 a sectional elevation of the valve, similar to the one shown in Fig. 4, and adapted to discharge air into the atmosphere.

Referring to Fig. 1, the valve comprises a casing 5, of generally cylindrical formation, which is provided at its lower end, on one side, with a laterally extending neck 6, furnishing an inlet passage 7, which opens into a hollowed out cup or pocket 8, communicating directly with the interior of the shell. The cup or pocket communicates with a discharge chamber 9 formed on the interior of a depending stem 10, which is bored to furnish a threaded discharge passage 11. The discharge chamber 9 is adapted to communicate with the cup or pocket 8 through a by-pass 12, which is controlled by means of a by-pass valve 13 operable from the outside of the shell or casing of the valve.

The features above described are old in the art and further reference to the same is deemed unnecessary.

The casing is closed, at its upper end, by means of a cap 14, provided with a depending annular rim 15, which threads into the interior of the upper end of the shell. The cap is provided, at its center, with a threaded plug 16, which is provided with a recess 17 adapted to receive the upper end of an air inlet tube 18, which upwardly extends from and is carried by an elongated float 19. The float is provided, at its lower end, with a depending tubular valve piece 20, which is entered into a valve plug 21, threaded into the bottom or floor of the chamber of the casing, and is provided with a centrally disposed, vertical discharge port 22, which port is in communication with the air passage through the tubular valve piece 20. The lower end of the valve piece is adapted to seat against the flared rim or mouth 23 of the discharge port, which rim or mouth merges into a transversely extending water outlet port 24 cut through the valve plug from side to side thereof, through which valve port the valve piece extends when seated, so as to prevent the escape of water. The valve plug is shouldered at a point 25 and entered through an outer cup 26, the bottom of which bears against the floor of the valve casing and is clamped thereon by the valve plug. The upper rim of the cup 26 extends up to a point which is preferably slightly below the line of flotation of the float, and the cup coöperates with an inner cylindrical shell 27, which is inwardly rounded, at its lower end 28, to conform with the curvature of the lower portion of the outer cup 26, the inner shell being open at its lower end, which terminates at or near the bottom of the float. The upper end of the inner shell 27 is entered into a recess 29 on the inner face of the cap or cover, to which it can be brazed, or otherwise connected or attached, so that the shell will be carried by the cover. The inner shell, near its upper end, is provided with air inlet holes 30, which permit the air to pass up to the top of the float chamber formed by the inner shell and find an outlet through the valve.

The valve of Fig. 2 is similar to that previously described, with the exception that it is provided with a baffle plate 31, which depends into the cup or pocket 8, and is further provided with a ball check valve 32 for preventing the return of water of condensation from the valve through the inlet passage to the radiator.

In order to prevent the water from falling immediately into the annular space between the inner shell 27 and the surrounding cup 26, the upper edge of the latter is inturned in the form of an annular flange 36, which abuts against the direct in-flow of water, as it falls from the inlet passage, and this inturned annular flange also serves as a guide and support for the depending shell, which will be properly centered and held by its engagement with the flange.

The valve of Fig. 3 is similar in all respects to that previously described, with the exception that the upper edge of the inner shell 27 is provided with a bead 33, which is spun into an annular groove 34 on the inner face of the annular rim 15 of the cap or cover.

The valve of Fig. 4 is similar in all respects to the valve of Fig. 3, with the exception that the valve of Fig. 4 is provided with an inlet passage 35 at or near the top of the casing, instead of at the bottom, so that the water will be admitted to the casing at the top. The cup of the valve in Fig. 4 is also provided with an inturned annular flange similar to that shown in Figs. 2 and 3, which also serves the guiding and centering function of the flange shown in these figures, although in the valve of Figs. 1, 2 and 3, in which the water is admitted at the bottom, the flange may be dispensed with, as is shown in Fig. 1. Water, however, is admitted into the annular space through water inlet holes 37 formed around the upper edge of the cup and immediately below the inturned annular flange 36.

In Fig. 5 is shown a valve similar to that of Fig. 4, except for the fact that no provision is made for the discharge of air through the float, the air being discharged through a pet cock 38 screwed into the plug 16 in the center of the cap or cover, and in place of the air inlet tube and the tubular valve piece carried by the float, a solid guide stem 39 and a solid valve piece 40 are provided.

The operation of the valves of Figs. 1, 2 and 3 is the same. When the valve is attached to the return side of a radiator and steam is admitted into the radiator, the air will be forced ahead of the steam and will pass through the inlet passage, which will ordinarily be sealed with water, and thence will pass to the top of the casing and through the air inlet holes in the inlet shell to the top of the float chamber afforded thereby. The discharge of air from the float chamber is effected through the air inlet tube in the top of the float and the tubular valve piece in the bottom of the float, the air being drawn off by the suction in the return pipe, to which the valve is connected. After the air has been thus discharged from the radiator, the steam will follow and will ascend up through the accumulated water in the bottom of the chamber, and more or less of the steam will be condensed in the upper part of the float chamber. The steam being moist, it will not flow freely through the air inlet tube in the top of the float, and this small passageway, which retards the passage of steam, acting in conjunction with the water seal formed in the bottom of the casing, will conserve the steam and prevent its escape in any material volume from the radiator. As water of condensation is formed in the radiator, it will flow into the valve casing, and the superior pressure of the steam in the radiator as compared with the pressure in the float chamber, will force the water of condensation up into the valve casing until it rises to a point where it will overflow the edge of the cup 26 and flow down into the cup. The rise of water in the cup will fill the space within the inner shell and around the float, the lower end of which will thus be immersed in a comparatively quiet body of water, which will be undisturbed by the in-flow of water in the inlet passage. After the water has risen to the line of flotation of the float, the latter will be raised and a portion of the water thus accumulated will be discharged through the water outlet port, and thence through the discharge port and into the return pipe.

In the ordinary operation of the valve, a considerable volume of water will be retained in the cup and within the inner shell surrounding the float, so that after the initial accumulation of water in the valve, there will be sufficient water to maintain a water seal in the lower part of the valve casing at all times. The float will be guarded against the direct impingement of the inflowing water, so that it will operate in a substantially quiet body of water, with the result that its operation will be noiseless, and with the further result that it will not be subjected to the motor action of the inrushing water, which would tend to cause inequalities in its movements. By carrying the inner shell from or by the cap or cover of the valve casing, it will be possible to remove the shell with the cap, and thereafter remove the float, after which the cup can be thoroughly cleaned, if desired, or the cup can also be removed by unscrewing the valve plug, which affords access to every portion of the interior of the valve.

The operation of the valve of Figs. 4 and 5 differs somewhat from that hitherto described, in that the water of condensation will be admitted at the top of the casing, so that no water seal will be afforded within the valve itself against the escape of air through the air vent. In so far as the function and usefulness of the outer cup and inner shell are concerned, however, the valves of Figs. 4 and 5 differ not at all from the valves previously described. It will be seen from the foregoing description that ample provision is made for the protection of the float against disturbing influences, and, at the same time, provision is made for disassembling and reassembling the valves without difficulty, for the purpose of cleaning or repair. However, the valve will ordinarily remain clean, for the reason that oil or floatage which enters the casing, being light, will rise to the top of the body of water occupying the annular space between the outer cup and the inner shell and will rarely, if ever, find access to the interior of the inner shell and in contact with the float.

I claim:

1. In a valve of the class described, the combination of a casing provided with an inlet passage and a discharge passage, a float within the casing for governing the discharge passage, an outer guard member, as a cup, surrounding the lower end of the float and secured to the bottom of the casing, a cap or cover for the casing, an inner shell carried by and removable with the cap or cover and extending down within the outer member, and means for discharging the air from the casing, substantially as described.

2. In a valve of the class described, the combination of a casing provided with an inlet passage and a discharge passage, a float within the casing for governing the discharge passage, an outer guard member, as a cup, surrounding the lower end of the float and secured to the bottom of the casing, a cap or cover for the casing, an inner shell carried by and removable with the cap or cover and extending down within the outer member and cut away at its lower end, and means for discharging the air from the casing, substantially as described.

3. In a valve of the class described, the combination of a casing provided with an inlet passage and a discharge passage, a float within the casing, provided with a tubular valve piece, for governing the discharge passage, an outer guard member, as a cup, surrounding the lower end of the float and carried by the bottom of the casing, a cap or cover for the casing, and an inner shell secured to and removable with the cap or cover and extending down within the outer member, the float being provided at its upper end with a member furnishing an air inlet passage adapted to coöperate with the tubular valve piece in discharging the air from the casing, and the inner shell being provided near its upper end with an air inlet hole, substantially as described.

4. In a valve of the class described, the combination of a casing provided with an inlet passage and a discharge passage, a float within the casing, provided with a tubular valve piece, for governing the discharge passage, an outer guard member, as a cup, surrounding the lower end of the float and secured to the bottom of the casing, a cap or cover for the casing, and an inner shell carried by and removable with the cap or cover and extending down within the outer member and cut away at its lower end, the float being provided at its upper end with a member furnishing an air inlet passage adapted to coöperate with the tubular valve piece in discharging the air from the casing, and the inner shell being provided near its upper end with an air inlet hole, substantially as described.

5. In a valve of the class described, the combination of a valve casing provided with an inlet passage and a discharge passage, a shouldered valve plug entered into the floor of the casing and provided with a discharge port communicating with the discharge passage, a valve piece governing the discharge port, a float from which said valve piece depends, the valve plug being provided with a water outlet port communicating, when the valve piece is raised, with the discharge port, an outer-guard member, as a cup, clamped to the floor of the casing by the shouldered valve plug, a cap or cover for the casing, an inner shell carried by and removable with the cap or cover extending down within the outer member and opened at its lower end, and means for discharging the air from the upper portion of the casing, substantially as described.

6. In a valve of the class described, the combination of a valve casing provided with an inlet passage and a discharge passage, a shouldered valve plug entered into the floor of the casing and provided with a discharge port communicating with the discharge passage, a tubular valve piece governing the discharge port, a float from which said tubular valve piece depends, the valve plug being provided with a water outlet port communicating, when the valve piece is raised, with the discharge port, an outer guard member, as a cup, clamped to the floor of the casing by the shouldered plug, a cap or cover for the casing, an inner shell carried by and removable with the cap or cover extending down within the outer member and opened at its lower end, a valve inlet tube upwardly extending from the float and adapted to coact with the tubular valve piece in discharging the air from the casing, and an inlet hole near the top of the inner shell for admitting air within the inner shell, to be discharged through the air inlet tube, substantially as described.

7. In a valve of the class described, the combination of a casing having a chamber formed therein, said casing being provided with an inlet passage and a discharge passage, a float within the chamber, a valve carried by the float for governing the discharge passage, a cap or cover for the upper end of the casing, a shell carried by and removable with the cap or cover, said shell being open at its lower end and surrounding the float, and having at its upper end an air eduction opening, and a shield for the open lower end of the shell for preventing the forcible admission of water into the open end of the shell around the float, and serving as a shield for protecting the lower end of the float against the strong impact and agitation from the in-rushing water, substantially as described.

8. In a valve of the class described, the combination of a casing having a chamber formed therein, said casing being provided with an inlet passage and a discharge passage, a float within the chamber, a valve carried by the float for governing the discharge passage, a cap or cover for the upper end of the casing, a shell carried by and removable with the cap or cover, said shell being open at its lower end and surrounding the float, and having at its upper end an air eduction opening, and a shield for the open lower end of the shell for preventing the forcible admission of water into the open end of the shell around the float, and serving as a shield for protecting the lower end of the float against the strong impact and agitation from the in-rushing water, the shell and shield coöperating to furnish outer, intermediate and inner bodies of water within the float chamber, the intermediate and inner bodies of water being free from agitation and the outer body of water providing a seal against the free passage of air and steam from the radiator into the casing, substantially as described.

9. In a valve of the class described, a shell provided with an inlet passage near its upper end and a discharge passage at its lower end, a float within the casing for governing the discharge passage, an outer guard member, as a cup, surrounding the lower end of the float and secured to the bottom of the casing, a cap or cover for the casing, an inner shell carried by and removable with the cap or cover and extending down within the outer member, and means for discharging the air from the casing, substantially as described.

10. In a valve of the class described, a shell provided with an inlet passage near its upper end and a discharge passage at its lower end, a float within the casing for governing the discharge passage, an outer guard member, as a cup, surrounding the lower end of the float and secured to the bottom of the casing, a cap or cover for the casing, an inner shell carried by and removable with the cap or cover and extending down within the outer member and cut away at its lower end, and means for discharging the air from the casing, substantially as described.

11. In a valve of the class described, a shell provided with an inlet passage near its upper end and a discharge passage at its lower end, a float within the casing, provided with a tubular valve piece, for governing the discharge passage, an outer guard member, as a cup, surrounding the lower end of the float and secured to the bottom of the casing, a cap or cover for the casing, and an inner shell carried by and removable with the cap or cover and extending down within the outer member and cut away at its lower end, the float being provided at its upper end with a member furnishing an air inlet passage adapted to coöperate with the tubular valve piece in discharging the air from the casing, and the inner shell being provided near its upper end with an air inlet hole, substantially as described.

12. In a valve of the class described, a shell provided with an inlet passage near its upper end and a discharge passage at its lower end, a float within the casing, provided with a tubular valve piece, for governing the discharge passage, an outer guard member, as a cup, surrounding the lower end of the float and secured to the bottom of the casing, a cap or cover for the casing, and an inner shell carried by and removable with the cap or cover and extending down within the outer member and cut away at its lower end, the float being provided at its upper end with a member furnishing an air inlet passage adapted to coöperate with the tubular valve piece in discharging the air from the casing, and the inner shell being provided near its upper end with an air inlet hole, substantially as described.

FRED W. LEUTHESSER.

Witnesses:
 MARY R. FROST,
 EPHRAIM BANNING.